United States Patent [19]

Nelson

[11] Patent Number: 4,754,357
[45] Date of Patent: Jun. 28, 1988

[54] STATIC INHIBITING BARS FOR VIDEOTAPE CASSETTE

[75] Inventor: Norman E. Nelson, Roseville, Minn.

[73] Assignee: Minnesota Mining and Manufacturing Company, St. Paul, Minn.

[21] Appl. No.: 697,800

[22] Filed: Feb. 4, 1985

[51] Int. Cl.⁴ ............................................. G11B 23/02
[52] U.S. Cl. ...................................... 360/132; 242/199
[58] Field of Search ................... 360/132, 128–129; 242/197–201; 206/387; 361/214

[56] References Cited

U.S. PATENT DOCUMENTS 3,934,842  1/1976  Posso .................................... 242/199
4,126,283 12/1978  Kawachi ............................. 242/199
4,368,860  1/1983  Goto ................................... 242/199
4,419,708 12/1983  Ogiro et al. ........................ 360/132
4,466,582  4/1984  Shiba ............................. 242/199 X Primary Examiner—John H. Wolff
Assistant Examiner—David J. Severin
Attorney, Agent, or Firm—Donald M. Sell; David W. Anderson

[57] ABSTRACT

The front-facing planar surfaces of a videotape cassette is provided with a series of parallel triangular or semi-elliptical ribs spaced from each other a maximum distance of about 4 mm so that an air barrier is produced between the tape and the ribs and the tape is thus prevented from contacting the planar surface or the ribs when the tape is in motion past the ribs.

3 Claims, 1 Drawing Sheet

STATIC INHIBITING BARS FOR VIDEOTAPE CASSETTE

BACKGOUND OF THE INVENTION

1. Field of the Invention

This invention relates generally to magnetic recording tape cartridges and particularly to videotape cassettes.

2. Description of the Prior Art

Videotape cassettes, and particularly those of the VHS format, include a generally rectangular housing within which is located two spools upon which is convolutely wound a magnetic recording tape. The cassette includes guide rollers positioned adjacent an edge of the cassette which directs the tape between the two spools along, and parallel to, one edge of the cassette. Forming a portion of the edge along which the tape is guided are two coplanar surfaces, each having a dimension of approximately one inch in the direction of tape travel. These surfaces are usually smooth to prevent damage to the tape as it travels between the two spools.

The videotape cassette is usually manufactured by molding and it has been found that a static electrical charge is induced on the cassette during this process. In many cases, this charge is high enough to cause considerable attraction between the planar surfaces along the tape path and the magnetic tape, and this attraction is magnified by opposite charges generated on the tape by its moving contact with the planar surfaces.

When the magnetic tape moves past the planar surfaces of the cassette, particularly at high speeds, the attraction between the cartridge and the tape causes contact and friction between the tape and the planar surfaces which, in turn, generates additional static electrical charges which increases the attraction. This continuing cycle of increased attraction and static electrical charge generation results in a static electrical charge which may reach several thousand volts and friction between the tape and the planar surfaces which may prevent tape movement. Even if the friction between the tape and the cartridge is not so great as to prevent movement, debris is generated which may degrade the recording characteristics of the tape. Noise is also produced by periodic adhesion and release of the tape relative to the planar surfaces when the tape is in motion, adversely affecting the perceived quality of the cassette.

SUMMARY OF THE INVENTION

To reduce contact and friction between the cartridge and the magnetic tape, and thus to reduce static electrical charges and debris generated by this contact and friction, the coplanar surfaces of the cartridge are provided with a series of parallel ribs spaced along and projecting above the planar surfaces and oriented at an angle between 45 degrees and 90 degrees to the tape path. The ribs are spaced from each other a maximum distance of about 8 mm so that the tape is prevented from contacting the planar surfaces at least when the tape is in motion past the ribs.

BRIEF DESCRIPTION OF THE DRAWING

The present invention will be more thoroughly described with reference to the accompanying drawing, wherein like numbers refer to like parts in the several views, and wherein.

DESCRIPTION OF THE PREFERRED EMBODIMENTS

Figure 1:
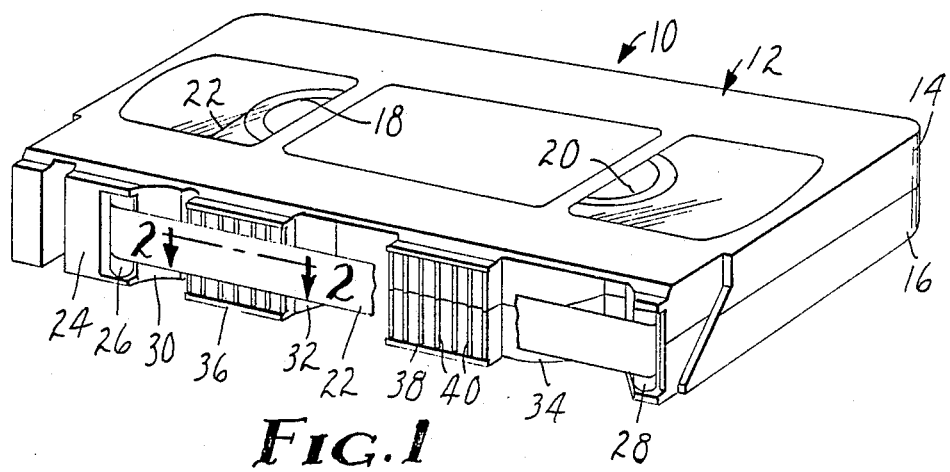
FIG. 1 is a perspective view of a videotape cassette including ribbed forward surfaces according to the present invention.

FIG. 1 illustrates a magnetic recording tape cartridge 10 comprised of a housing, generally indicated as 12, which is composed of an upper portion 14 and a lower portion 16. The mating upper and lower portions 14 and 16 of the housing 12 are usually molded of medium or high impact grade polystyrene or acrylonitrile butadiene-styrene. Within the housing 12 are located two tape spools 18 and 20 around which is convolutely wound a magnetic recording tape 22. The recording tape 22 is directed along and parallel to the front face 24 of the housing 12 by guide means including rollers 26 and 28 adjacent the two front corners of the housing 12. The front face 24 of the housing 12 and the exposed portion of the magnetic tape 22 is usually covered by a pivoting door which has not been illustrated for the sake of clarity.

The particular magnetic recording tape cartridge illustrated is known as a VHS format videotape cassette and is used with a videotape recorder (not shown) to record video signals. The recorder includes drive spindles which access the spools 18 and 20 through apertures in the lower portion 16 of the housing 12 and also includes projecting fingers which extend into recesses 30, 32 and 34 spaced along the front face 24 of the cassette 10 and operate to pull the tape 22 forward and wrap the tape 22 around a rotating magnetic transducer. The recesses 30, 32 and 34 are connected by coplanar surfaces, or bridges, 36 and 38 which form a portion of the front face 24 of the housing 12 and support the tape 22.

When it is desired to access widely separated portions of the tape 22, the videotape recorder is placed in either a "fast forward" or "rewind" mode in which one of the tape spools 18 or 20 is rapidly driven to coil the tape 22 quickly from one spool 18 or 20 to the other. In either of these fast forward or rewind modes, the projecting fingers of the videotape recorder are retracted and the tape 22 assumes the position illustrated in FIG. 1.

The surfaces of the bridges 36 and 38 are usually smooth and it has been observed that the magnetic tape 22 is attracted to and frictionally rubs along the surfaces of the bridges 36 and 38 during either of the fast forward or rewind modes. This attraction between the tape 22 and the bridges 36 and 38 is caused by a static electrical charge which is either induced on the housing 12 during the molding operation or generated by frictional contact between the tape 22 and the bridges 36 and 38. The attraction between the tape 22 and the bridges 36 and 38 causes noise due to periodic contact and release and results in friction between the tape 22 and the bridges 36 and 38. This friction produces debris from both the tape 22 and the bridges 36 and 38 which may degrade the recording characteristics of the tape and also results in a drag which slows the movement of the tape 22 and opposes the drive motor of the videotape recorder. These problems are worsened during operation because the frictional contact between the tape 22 and the bridges 36 and 38 produces an increased static electrical charge which increases the attraction between the tape 22 and the bridges 36 and 38. There results a cycle in which the friction between the tape 22 and the bridges 36 and 38 increases the static electrical attraction which in turn increases friction and leads to a yet greater attraction. It has been observed in some cases that this attraction and friction becomes progressively great enough to completely overcome the drive motors of the tape recorder and stop movement of the tape 22.

To prevent this cycle of attraction/friction, the bridges 36 and 38 are provided, according to the invention, with parallel ribs 40 which extend outwardly from the planar surfaces of the bridges 36 and 38 to reduce the area of contact between the tape 22 and the cassette 10.

Figure 2:
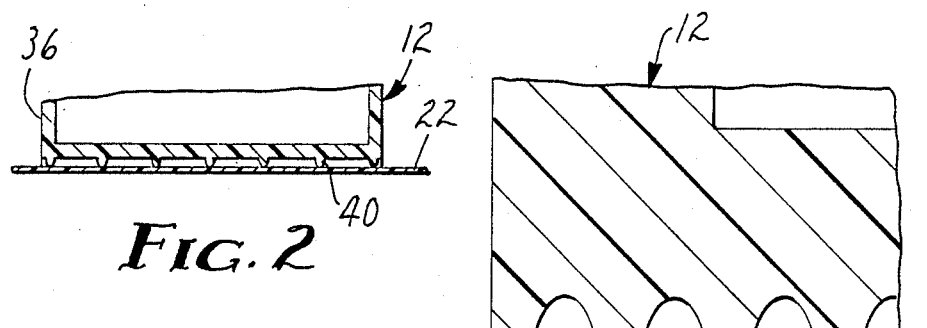
FIG. 2 is a cross-sectional view of the cassette of FIG. 1 and the ribs of the present invention, taken generally along the line 2—2 of FIG. 1.
Figure 3:
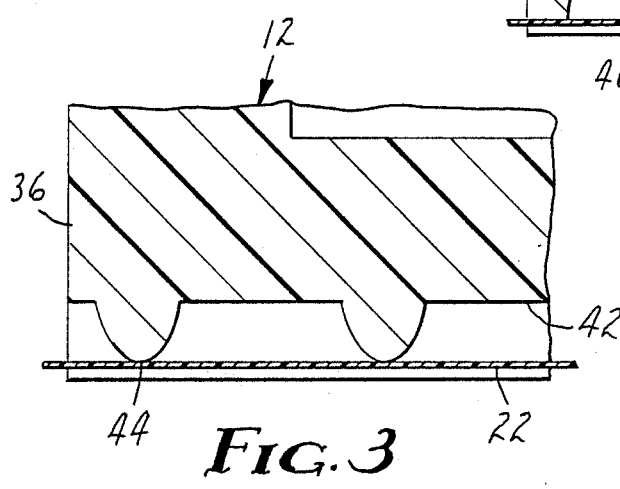
FIG. 3 is an enlarged cross-sectional view of a portion of FIG. 2 illustrating the ribs of the present invention in greater detail.

The ribs 40 are best seen in FIGS. 2 and 3 and project a preferred distance of 0.25 mm from the flat surface 42 of the bridges 36 and 38. The ribs 40 are also preferably semi-elliptical or triangular in cross-section and include a rounded tip 44 to reduce abrasion of the tape 22. The ribs 40 are preferably oriented parallel to each other and perpendicular to the direction of tape travel, although an orientation of between 45 and 90 degrees has been found effective. An "X"-shaped configuration, in which ribs overlap and are oriented at opposite equal angles, might also prove useful. Such a configuration would further reduce the possibility of contact between the tape 22 and the flat surfaces 42 of the bridges 36 and 38.

The spacing between successive ribs 40 in the direction of tape travel has been found to be critical in that excessive spacing between successive ribs 40 will allow the tape 22 to be attracted to and contact the flat surface 42. A spacing between successive ribs 40 of less than about 8 mm has been found necessary to prevent such contact. A spacing of approximately 4 mm is preferred, however, because such a spacing has been shown to cause the production of an air barrier between the tape 22 and the flat surfaces 42 of the bridges 36 ad 38. This air barrier cushions the tape 22 and prevents contact between the tape 22 and the ribs 40 in addition to preventing contact between the tape 22 and the flat surfaces 42. Thus a minimum spacing between successive ribs 40 of 8 mm has been found necessary to prevent contact between the tape 22 and the flat surfaces 42 and a preferred spacing of 4 mm has been found effective to produce an air barrier which prevents any contact between the tape 22 and the cassette 10.

Figure 4:
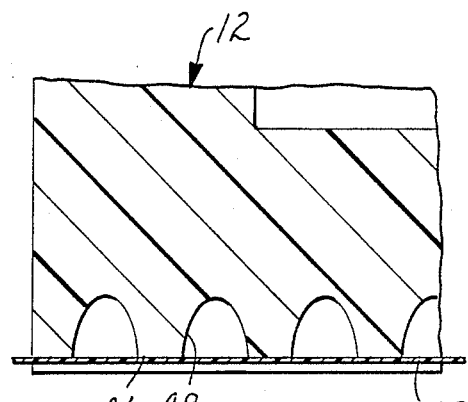
FIG. 4 is an enlarged cross-sectional view similar to FIG. 3, illustrating an alternate embodiment of the ribs of the present invention.

FIG. 4 illustrates an alternate embodiment of ribs 46 according to the present invention, in which the ribs 46 are produced by cutting or molding semi-elliptical grooves 48 into the surface of the bridges 36 and 38. Although the ribs 46 are formed by the subtraction of material rather than its addition, the ribs 46 of FIG. 4 are equivalent to the ribs 44 of FIGS. 2 and 3 in that the area of contact between the tape 22 and the cassette 10 is reduced.

Although the present invention has been described with respect to only a limited number of preferred embodiments, it is recognized that a number of modifications will be apparent to those skilled in the art. All such modifications falling within the spirit and scope of the appended claims are intended to be included.

I claim:

1. An improved tape cassette of the type which includes a generally rectangular housing, two spools within the housing upon which is convolutely wound a magnetic recording tape, guide means for directing the tape between the spools and along a tape path parallel to one edge of the housing, and at least one planar surface parallel to and partially coextensive with the tape path and defining a portion of the one edge of the housing, the improvement comprising:

a series of unitary parallel ribs spaced along and projecting outwardly from said planar surface and oriented at an angle of between 45 degrees and 90 degrees with respect to said tape path, said ribs being spaced from each other a maximum distance of 4 mm so that an air barrier is produced between said tape and said ribs and thereby, precluding contact between said planar surface or said ribs and said tape when said tape is in motion past said ribs.

2. An improved tape cassette according to claim 1 wherein said ribs are triangular in cross-section and include rounded apexes.

3. An improved cassette according to claim 1 wherein said ribs are oriented at an angle of 90 degrees to said tape path.

* * * * *